United States Patent [19]
Frizelle

[11] 3,857,818
[45] Dec. 31, 1974

[54] BLOCKED POLYURETHANE POWDER COATING COMPOSITIONS

[75] Inventor: Gerald L. Frizelle, Gladstone, Mo.

[73] Assignee: Cook Paint and Varnish Company, Kansas City, Mo.

[22] Filed: Sept. 18, 1972

[21] Appl. No.: 289,968

[52] U.S. Cl............ 260/77.5 TB, 117/17, 117/21, 117/161, 260/77.5 CR, 260/859
[51] Int. Cl....... C08g 22/32, C09d 3/72, B05d 5/00
[58] Field of Search...... 260/77.5 TB, 77.5 CR, 859

[56] References Cited
UNITED STATES PATENTS

| | | | |
|---|---|---|---|
| 3,659,003 | 4/1972 | Johnson et al. | 260/859 |
| 3,660,359 | 5/1972 | Labana | 260/77.5 CR |
| 3,694,389 | 9/1972 | Levy | 260/23 TN |
| 3,711,571 | 1/1973 | Farah | 260/858 |
| 3,721,647 | 3/1973 | Mazzeo et al. | 260/77.5 TB |

*Primary Examiner*—H. S. Cockeram
*Attorney, Agent, or Firm*—Cushman, Darby & Cushman

[57] ABSTRACT

A powder coating composition comprising a mixture of ketoxime-blocked isocyanate prepolymer and a hydroxy functional resin.

3 Claims, No Drawings

BLOCKED POLYURETHANE POWDER COATING COMPOSITIONS

BACKGROUND OF THE INVENTION

The invention is concerned with certain urethane-containing powder coating compositions which are suitable for application by electrostatic spraying or the like.

There is a real need for powder coating compositions which are capable of being applied electrostatically. One advantage of such coatings is that they can be applied by fusing from the solid state and thus obviate the use of organic solvents and the resultant need to recover these to avoid polluting the environment.

The principal object of the invention is to provide certain powder coating compositions which are uniquely suitable and effective for coating purposes. Other objects will also be evident from the following description of the invention.

BRIEF SUMMARY OF THE INVENTION

Broadly defined, the powder coating composition of the invention comprises a free flowing mixture of solid ketoxime-blocked isocyanate prepolymer and one or more solid hydroxy functional resins, e.g. a hydroxy functional polyester resin.

DETAILED DESCRIPTION OF THE INVENTION

Any solid ketoxime-blocked isocyanate prepolymer which becomes unblocked when the composition is heated to curing temperatures to yield free isocyanate for reaction with the hydroxyl functional resin can be used for present purposes. Particularly preferred is methyl ethyl ketoxime as the blocking agent although other alkyl ketoximes may also be effectively used provided that, together with the isocyanate, they give a solid blocked prepolymer which is unblocked at curing temperatures. Representative isocyanates for use herein are the aromatic and aliphatic di- and tri-isocyanates where the isocyanate groups are the only functional groups, e.g. triisocyanates such as Desmodur N (the biuret of hexamethylene diisocyanate); trimethyl hexamethylene diisocyanate; hexamethylene diisocyanate methyl ester of lysine diisocyanate; toluene diisocyanate; 4,4'methylene bis-(cyclohexyl isocyanate); and isophorone diisocyanate although any other similar di- and tri-isocyanate may also be used in lieu of these specific isocyanates. Adducts of these isocyanates with various polyhydric alcohols, e.g. alkylene glycols such as ethylene glycol and triols such as glycerine and trimethylol propane, may also be used.

The reactions involved to prepare the ketoxime-blocked isocyanate may be shown as follows:

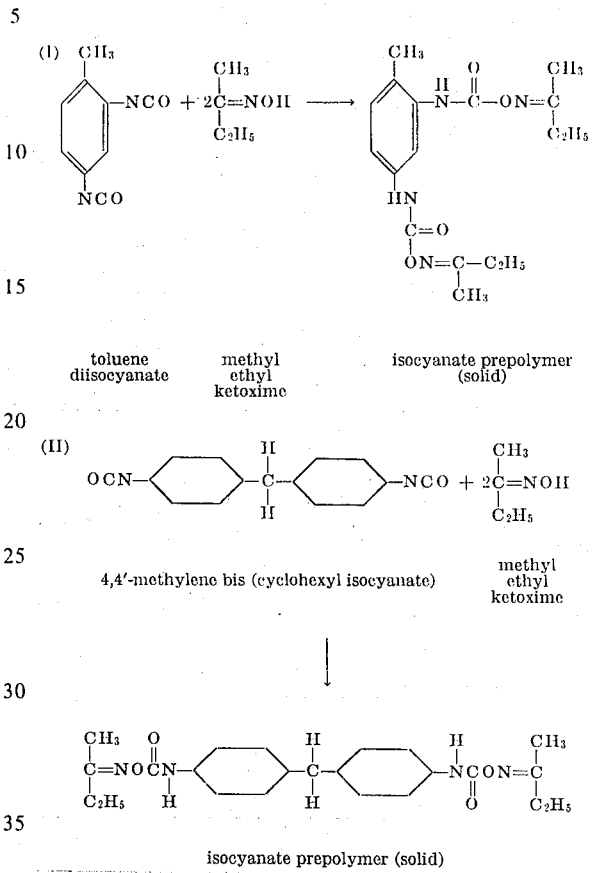

The above reactions (I) and (II) illustrate solids produced by reacting the di-isocyanates with only the ketoxime-blocking agent alone.

In a further embodiment of the invention, an amine, e.g. propane diamine, butylene diamine, bis(aminopropyl piperazine, iminobispropylamine and methyl iminobispropylamine, or the like, including mixtures, may be included. The amine may be used to give a solid isocyanate functional polymer in those cases where the ketoxime and isocyanate do not give a solid product by themselves. Any amine may be used provided the product is a solid, the amine being appropriately selected to give the product the desired melting point. Reactions (III) and (IV) below illustrate the use of propane diamine as a further reactant to produce solids which are isocyanate functional substituted ureas:

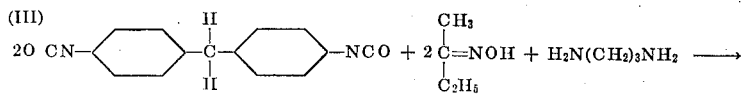

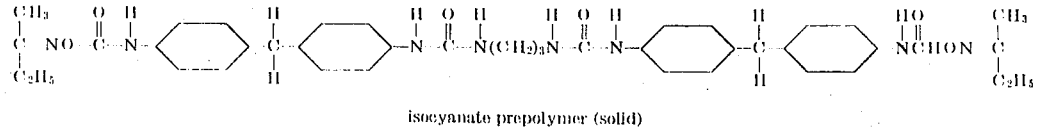

isocyanate prepolymer (solid)

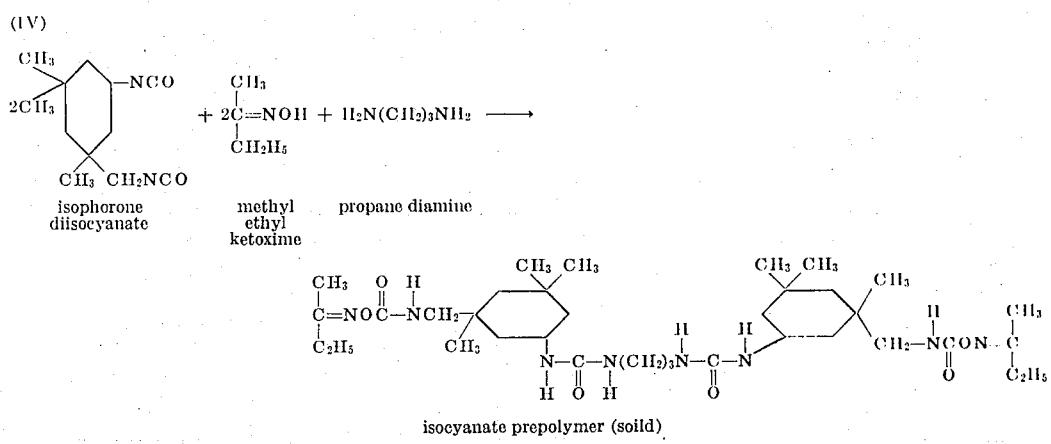

isocyanate prepolymer (soild)

It is to be noted that the product of reaction (III) without the diamine is not a solid. Use of the diamine, however, gives a solid product with a highly desirable melting point for electrostatic application.

The solid products described above can be readily blended with a solid hydroxyl functional polyester or other hydroxyl functional resin either by dry mixing the components or by melting the same together, preferably followed by milling or grinding, to give free-flowing, non-caking solid powder mixtures which can be sprayed electrostatically onto a substrate, e.g. iron, Bonderite steel, aluminum or other metal, followed by appropriate heat treatment to fuse and cure the mixture into a urethane coating.

The ketoxime-blocked prepolymer is normally prepared by gradually adding the oxime to the isocyanate in an inert atmosphere, e.g. under a nitrogen blanket. The reaction is exothermic and desirably the temperature is kept below 75°-80°C although this depends to some extent on whether or not a diluent or reaction medium is used. The temperature should not be excessively high since unreacted material may cause discoloration and the product may lose its non-caking, free-flowing properties. Naphtha is preferably used as a reaction medium although any other hydrocarbon medium or the like which is inert to the reactants can be used and, in such cases, the reaction may be carried out without the use of a reaction medium.

Sufficient ketoxime should be used to react with all of the —NCO groups in the isocyanate. Thus, when the isocyanate and ketoxime are used alone, one mol of ketoxime should be used per —NCO group in the isocyanate. A slight excess of ketoxime (e.g. not more than 1% by weight) may be used but this is not necessary. A significant excess of any reactant in the ultimate product is undesirable because this causes the formation of low-melting adducts that tend to cake.

When an amine is also used, the total amine/ketoxime content should be at least sufficient to react with all of the —NCO groups in the isocyanate. In this case, the amine should be used in an amount sufficient to give the product the desired melting point and ketoxime being otherwise present in sufficient amount to block —NCO groups not reacted by the amine.

The hydroxy functional resin is preferably a polyester resin. However, other hydroxy functional resins may also be used, for example, acrylic resins containing one or more functional hydroxy groups. The latter may be, for example, copolymers of at least one monomer such as styrene, αstyrene, methyl methacrylate, ethyl acrylate or the like and a hydroxy acrylic monomer such as hydroxy ethyl methacrylate, hydroxy propyl methacrylate, hydroxy ethyl acrylate, hydroxy propyl acrylate and the like.

The invention is illustrated, but not limited, by the following examples wherein any parts and percentages are by weight unless otherwise stated:

EXAMPLE 1

A urethane powder coating was prepared with a composition consisting of a solid particulate oxime blocked 4,4'-methylene bis(cyclohexyl isocyanate)prepolymer and a solid particulate hydroxy functional polyester. This powder coating was dry blended and milled to a fine non-caking powder (200-325 mesh). In another alternative, the components were melted together (using a temperature below the unblocking and curing temperature of the composition) and milled to a fine powder. Both compositions were sprayed electrostatically onto an iron substrate and cured in conventional manner for 15 minutes at 175°-190°C. Upon such heat treatment, the powders fused and cured producing highly desirable urethane coatings.

The blocked isocyanate prepolymer was prepared as described below by reaction of one mol (48 parts) 4,4'methylene bis(cyclohetyl isocyanate) and two moles (32 parts) methyl ethyl ketoxime in naphtha (20 parts).

The hydroxy functional polyester was the reaction product of the following:

| Polyester Components | Moles | Parts |
|---|---|---|
| trimethylol propane | 0.6 | 12.8 |
| neopentyl glycol | 1.6 | 26.9 |
| caprolactone | 0.4 | 7.2 |
| isophthalic acid | 2 | 53.1 |

The isocyanate prepolymer and hydroxy functional polyester components were mixed at an NCO/OH ratio of 0.8:1 but equivalent results are obtainable using isocyanate prepolymers and hydroxy functional resins in amounts such that the NCO/OH ratios of the mixture are in the range of about 0.6/1.0 to 1.5/1.0.

The polyester component used herein was prepared as follows:

The reactants were charged into a flask and cooked under a nitrogen blanket at 225°-230°C for 8-12 hours or until the reaction product had an acid number of less than 4. The product was removed from the flask at 100°C, cooled and broken up into relatively small particles. The particles were then ready for blending with the ketoxime blocked prepolymer and milling as described above. The polyester had a melting point of 93°-99°C.

The ketoxime-blocked prepolymerr used herein was prepared as follows:

The 4,4'methylene bis(cyclohexyl isocyanate) (Hylene W) and solvent (VM&P naphtha) were charged to the reaction flask and the oxime was added slowly. The reaction was exothermic and the temperature of the reaction was held below 75°C by the boiling point of the oxime and because the color of the product tended to increase with higher temperature. The product began to precipitate when approximately 75% of the oxime had been added, and continued as the rest of the oxime was added. The naphtha was used because the isocyanate and oxime are both soluble in it while the product is very insoluble therein. The oxime-blocked product was a white solid with a melting point of 100°-105°C. It was recovered by filtering from the naphtha reaction liquid and drying. The yield was about 99%.

EXAMPLE 2

The hydroxy functional polyester of Example 1 was dry blended with a solid blocked isocyanate prepolymer composition comprising the product (melting point of 95°-100°C) obtained by reacting 1 mole (51.4 parts) 4,4'-methylene bis (cyclohexyl isocyanate) and 2 moles (28.6 parts) acetoxime in naphtha (20 parts) made in the manner shown in Example 1. A free-flowing powder was obtained which gave excellent coatings, characterized by the combination of high hardness and good flexibility together with high mar resistance, on electrostatic sparying with fusing and curing as in Example 1.

EXAMPLE 3

Example 2 was repeated with good results using the blocked isocyanate prepolymer (melting point 105°-110°C) obtained by reacting toluene diisocyanate (1 mole or 40.5 parts) and 2 moles (39.5 parts) methyl ethyl ketoxime in VM&P naphtha (20 parts) in the manner shown in Example 1.

EXAMPLE 4

The blocked isocyanate prepolymer of Example 1 was dry blended with equal parts of a hydroxy acylic copolymer (melting point: 85°-90°C) made by polymerizing 60 parts alpha methyl styrene, 10 parts hydroxy ethyl methacrylate, 5 parts acrylonitrile and 21 parts styrene using 4 parts t-butyl perbenzoate as catalyst. Application of the resultant composition by electostatic spray to a metal substrate gave excellent coatings showing high hardness and flexibility.

The acrylic copolymer used herein was prepared as follows:

The alpha methyl styrene was charged to a flask. The other monomers were then pre-mixed with the perbenzoate and this mix was then added to the flask over a 4-hour period under nitrogen. Initially the alpha methyl styrene was brought to reflux and then the monomer mix was added. The resulting mixture was held at reflux for about 4 hours or until a constant viscosity was obtained. A vacuum was pulled, unreacted monomer being removed and the product was then cooled, broken up, milled and blended with the isocyanate prepolymer.

EXAMPLE 5

Example 4 was repeated using a hydroxy functional acrylic copolymer composition (melting point 85°-90°C) comprising the product obtained by copolymerizing 57.6 parts alpha methyl styrene, 31.7 parts styrene, 6.7 parts hydroxy ethyl acrylate, 2.0 parts t-butyl perbenzoate and 2.0 parts di-t-butyl peroxide. The results were essentially the same as in Example 4.

EXAMPLE 6

Example 1 was effectively repeated using, as the blocked isocyanate prepolymer, the reaction product (melting point 100°-110°C) of 3 parts toluene diisocyanate, 1 part trimethylol propane and 3 parts methyl ethyl ketoxime. Generally similar results were also obtained using the solid isocyanate functional prepolymer obtained by reacting 2 moles of isophorone diisocyanate, 2 moles of methyl ethyl ketoxime and 1 mole of propane diamine in VM&P naphtha. The prepolymer was a white solid melting at 105°-110°C. Similar results were also obtained using the blocked isocyanate (white solid, 105°-110°C) prepared by reacting 2 moles of isophorone diisocyanate, methyl ethyl ketoxime and bis-(amino propyl) piperazine in naphtha.

It is considered important to have the melted oxime-blocked isocyanate component become unblocked on heating after the polyester or other hydroxy functional resin melts. Desirably the melting points of the two components are fairly close together, possibly with not more than 2°-10°C difference. The unblocking of the isocyanate component should occur at a higher temperature than the melting temperatures of the two components. Usually, the blocked isocyanate and hydroxy functional resin will melt in the range of 80°-120°C, preferably 90°-110°C, with unblocking and curing at 135°-200°C, preferably 170°-190°c.

While other ketoximes may be used for present purposes, best results are obtained using methyl ethyl ketoxime or acetoxime as exemplified above.

The scope of the invention is defined in the following claims wherein:

I claim:

1. A solid, heat-curable powder coating composition consisting essentially of a solid powder mixture of a solid ketoxime-blocked organic polyisocyanate having no free isocyanate groups which becomes unblocked at the curing temperature and a solid hydroxy functioanl acrylic or polyester resin, the ratio of the blocked isocyanate to hydroxy resin being such as to give an NCO-/OH ratio of 0.6/1.0 to 1.5/1.0 and said solid hydroxy functional resin being selected from the group consisting of (A) solid hydroxy functional acrylic copolymers of (1) at least one monomer selected from the group consisting of styrene, α-methyl styrene, alkyl methacrylates and alkyl acrylates and (2) a hydroxy alkyl acrylate or methacrylate; and (B) solid hydroxy functional polyesters of polyhydric alcohols and dibasic acids.

2. The composition of claim 1 wherein the blocked polyisocyanate is the reaction product of methyl ethyl ketoxime and a diisocyanate.

3. The composition of claim 1 wherein the diisocyanate is toluene diisocyanate or 4,4'-methylene bis(cyclohexyl isocyanate).

* * * * *